United States Patent [19]

Park

[11] Patent Number: 4,605,682

[45] Date of Patent: Aug. 12, 1986

[54] LIGHTLY CROSSLINKED POLYETHYLENE POLYSTYRENE BLEND FOAMS AND PROCESS FOR MAKING

[75] Inventor: Chung P. Park, Pickerington, Ohio

[73] Assignee: The Dow Chemical Company, Midland, Mich.

[21] Appl. No.: 697,653

[22] Filed: Feb. 4, 1985

[51] Int. Cl.$^4$ ............................................. C08J 9/14
[52] U.S. Cl. ........................................ 521/81; 264/53; 521/79; 521/96; 521/139
[58] Field of Search ............... 521/139, 79, 98, 96, 521/81

[56] References Cited

U.S. PATENT DOCUMENTS

| | | | |
|---|---|---|---|
| 4,246,211 | 1/1981 | Kühnel | 521/79 |
| 4,262,052 | 4/1981 | Kannan et al. | 428/306 |
| 4,266,041 | 5/1981 | Kühnel | 521/79 |
| 4,289,857 | 9/1981 | Hoki et al. | 521/79 |
| 4,343,911 | 8/1982 | Hoki et al. | 521/79 |
| 4,452,751 | 6/1984 | McCullough et al. | 521/79 |
| 4,515,907 | 5/1985 | McCullough et al. | 521/79 |

FOREIGN PATENT DOCUMENTS 55-181384 12/1980 Japan.
1460621 1/1977 United Kingdom.

*Primary Examiner*—Morton Foelak
*Attorney, Agent, or Firm*—B. M. Kanuch

[57] ABSTRACT

A polymer foam made from a blend of a low density ethylenic polymer and styrenic polymer utilizing a volatile blowing agent and a free radical generating compound as a crosslinking agent. The free radical generating compound provides light crosslinking and increases the foamability of the polymer blend.

4 Claims, No Drawings

LIGHTLY CROSSLINKED POLYETHYLENE POLYSTYRENE BLEND FOAMS AND PROCESS FOR MAKING

BACKGROUND OF THE INVENTION

This invention relates to polymer foam materials made from blends of an ethylenic polymer and a styrenic polymer, and more particularly to a foamable blend of a polyethylene and a polystyrene lightly crosslinked by free radical generating compounds.

Both polystyrene foams and polyolefin foams have heretofore been used for a variety of purposes. Polystyrene foams are lightweight and have both rigidity and good shape retention. However, polystyrene foams are not resistent to solvents and are deficient in certain important properties such as flexibility, compressive recovery, and capacity to absorb repeated impacts. Polyolefin foams, while having flexibility and good impact absorbing properties, have generally suffered from low thermal resistance and have been subject to creep. It would be disirable to blend the two resins to produce foams having the advantageous properties of each.

Prior efforts to blend these two types of polymers have had to face the threshold problem that olefin and styrenic polymers are generally incompatible. For example, British Pat. No. 1,460,621 teaches a foam prepared from a blend polyethylene and polystyrene, combined with a block copolymer of styrene and butadiene or a graft polymer of styrene monomer onto polyethylene. The block or graft polymers are added to render the two other resins more compatible.

Japanese Patent Application No. 55/181,384 also teaches a foam which is a blend of polyethylene and polystyrene. However, the resin blend is foamable only for certain specified ratios of melt indices of polystyrene to polyethylene, and for certain polystyrene to polyethylene weight ratios.

Finally, Kannan et al, U.S. Pat. No. 4,262,052, teach a foamed composite material, one component thereof being a blend of a polyolefin, a vinyl aromatic polymer such as styrene, and a graft polymer formed by graft polymerizing a vinyl aromatic monomer onto the backbone of the polyolefin. A crosslinking agent such as an organic peroxide aids the grafting reaction.

However, all of these previous efforts to blend polyolefin and polystyrene resins to produce foams have either been complicated by the need for a separate reaction sequence to form a block or graft copolymer to add to the blend or have been limited to certain melt index or weight ratios of the starting resins. For example, the previously discussed Japanese Patent Application No. 55/181,384 utilized a very viscous, low melt index polyethylene. Such a viscous polymer causes pumping, pressure, and mixing problems in conventional melt processing equipment such as extruders.

Accordingly, the need exists in the art for a composition blending together these two types of resins so that they can be foamed readily by conventional melt processing techniques.

SUMMARY OF THE INVENTION

The present invention provides a polymeric foam composition made from a blend of about 95 to 50% by weight of a low density ethylenic polymer and about 5 to 50% by weight of a styrenic polymer utilizing free radical generating compounds such as organic peroxides as crosslinking agents. The blend also contains a volatile blowing agent.

Through the use of crosslinking by a free radical generating compound good quality foams are produced. Free radical generating compounds useful in the practice of the present invention are described in U.S. Pat. No. 3,646,155, the disclosure of which is hereby incorporated by reference. With respect to organic peroxide free radical generating agents, it is belived that while the peroxide crosslinks the ethylenic component of the blend, it depolymerizes the styrenic component, altering the viscosity ratio of the two components toward a more readily foamable direction. Surprisingly, not only branched chain low density ethylenic polymers but also linear low density ethylenic polymers can be used to produce foams in accordance with the present invention. Linear low density olefins are generally difficult to foam by conventional extrusion processes.

When made in accordance with the present invention, the foams have low densities, large cross-section, large cell size, reasonably low open cell content, good appearance, and good flow stability. Upon ambient aging, the foams exhibit excellent dimensional stability, even when relativey inexpensive blowing agents are utilized. For example, a low density polyethylene foam made with inexpensive FC-12 (dichlorodifluaromethane) blowing agent will shrink more than 30% of its initial volume during aging. However, a blend foam of the present invention made with the same blowing agent will shrink less then 20%, and depending on the particular polyolefin/polystyrene blend utilized, less than 10% of its initial volume.

Accordingly, it is an ojbect of the present invention to provide a foamable composition and process of making it using a blend of a low density ethylenic polymer and a styrenic polymer. This and other objects and advantages of the invention will become apparent from the following detailed description and the appended claims.

DESCRIPTION OF THE PREFERRED EMBODIMENTS

The process and composition of the present invention permit the production of low density foams by an extrusion process from either a linear or a branched-chain low density ethylenic polymer blended with a styrenic polymer. The invention provides a foam having desirable properties of both ethylenic and styrenic foams. In the case where a linear low density ethylenic polymer is utilized in the blend, the resulting foam also exhibits the additional desirable properties of higher temperature resistance and a higher heat distortion temperature than comparable foams of branched-chain olefins.

The polymer blend of the present invention comprises from about 5 to 50% by weight of a styrenic polymer and from about 95 to 50% by weight of a low density ethylenic polymer. As the styrenic polymer, polystyrene is preferred although other polymers or copolymers of vinyl aromatic monomers such as methylstyrene, ethylstyrene, or halogenated styrenes may be utilized. Exemplary copolymerizable monomers for the styrenic component of the blend also include acrylonitrile or bitadiene. Thus, both crystal (or general purpose) polystyrene and high impact polystyrene can be used in the present invention although crystal polystyrene is usually used. As the low density ethylenic polymer, low density polyethylene (LDPE) and linear low density polyethylene (LLDPE) are preferred, although other low density polyolefins or copolymers thereof may be utilized. Exemplary copolymerizable monomers for the ethylenic component of the blend include ethylenically unsaturated acids and esters such as acrylates and methacrylates, vinyl esters of carboxylic acids, as well as other olefinic hydrocarbons such as propylene, butylene, and butene.

The terms "low density polyethylene" and "linear low density polyethylene" are used herein in their conventional sense. The former is obtained by a high pressure process and typically has a density of about 0.910 to 0.932. LLDPE resins are available by either the high pressure or low pressure processing. Those used in the present invention are usually obtained through a Ziegler reaction and may be obtained as copolymers with higher alpha olefins. Their density is not as well defined as the LDPE's and may range from about 0.90 to 0.945.

The blowing agents useful in the practice of the present invention are well known and may comprise solids which decompose into gaseous products at extrusion temperatures or volatile liquids. A preferred class of blowing agents is the group of halogenated hydrocarbon compounds having from 1 to 4 carbon atoms and hydrocarbons having from 3 to 5 carbon atoms. Dichlorodifluoromethane (FC-12), 1,2 dichlorotetrafluoroethane (FC-114), trichloromonofluoromethane (FC-11), and mixtures thereof are most preferred. When these halogenated hydrocarbon compounds are used as the blowing agent, there can be from about 0.013 to 0.50 gram mole, and preferably about 0.04 to 0.30 gram mole of such blowing agent per 100 grams of polymer resin blend in the flowable gel or admixture. Mixtures of such blowing agents may also be used.

The blowing agent is compounded into the flowable polymer blend in the melt processing apparatus in proportions to make the desired degree of expansion in the resulting foamed cellular product to make products having foamed densities down to about 0.6 pounds per cubic foot (pcf). Depending on the amount of blowing agent added, the resulting foamed materials may have densities from about 0.6 to 15.0 pcf.

Crosslinking agents useful in the practice of the present invention are free radical generating compounds such as the organic peroxides and peresters disclosed in U.S. Pat. No. 3,646,155, the disclosure of which is hereby incorporated by reference. Specific examples of free radical generating compounds include benzoyl peroxide; dichlorobenzoyl peroxide; di-tertiary butyl peroxide; 2,5 dimethyl-2,5 di(peroxy benzoate)hexyne-3; 1,3-bis(t-butyl peroxy isopropyl)benzene; lauroyl peroxide; tertiary butyl peracetate; 2,5-dimethyl-2,5 di(t-butylperoxy)hexane; and tertiary butyl perbenzoate, as well as azo compounds such as azobisisobutyronitrile and dimethylazodiiosbutyrate. Most preferred as a crosslinking agent is dicumyl peroxide. The crosslinking agents are preferably added in an amount between about 0.001 to 0.5 pph, and most preferably between 0.01 to 0.1 pph of polymer blend.

The organic peroxides are believed to perform the dual function of crosslinking the ethylenic polymer component of the blend while depolymerizing the styrenic component, thus altering the viscosities of the two polymer components toward a more foamable condition. Because a controlled amount of crosslinking agent is added downstream in the melt processing equipment, no processing difficulties arise due to high polymer viscosity. This controlled amount of crosslinking agent produces a lightly crosslinked polymer blend melt which remains flowable without suffering severe melt fracture and has a melt index greater than about 0.05 and preferably greater than about 0.1.

In accordance with the process of the present invention, foams of a blend of a low density ethylenic polymer and a styrenic polymer may be made on conventional melt processing apparatus such as by continuous extrusion on a screw-type extruder. Such an extruder typically comprises a series of sequential zones including a feed zone, compression and melt zone, metering zone, and mixing zone. The barrel of the extruder may be provided with conventional electric heaters for zoned temperature control.

An inlet is provided for adding a mixture of fluid blowing agent and crosslinking agent under pressure to the polymer blend in the extruder barrel between the metering and mixing zones. Crosslinking agent is pumped, in a controllable manner, into the stream of fluid blowing agent upstream of the injection nozzle. The blowing agent and crosslinking agent are compounded into the starting polymer in a conventional manner to form a flowable gel or admixture, preferably in a continuous manner. Thus, the polymer blend, blowing agent, and crosslinking agent may be combined in the mixing zone of an extruder using heat to plastify the polymer resin, pressure to maintain the blowing agent in a liquid state, and mechanical working to obtain thorough mixing.

The discharge end of the mixing zone of the extruder is connected, through a cooling and temperature control zone, to a die orifice. The hot polymer gel is cooled and then passed through the die orifice into a zone of lower pressure (e.g., normal ambient air atmosphere) where the blowing agent is activated and the polymer gel expands to a lower density, cellular mass. As the foamed extrusion forms, it is conducted away from the die and allowed to cool and harden.

In practice, the temperature of the feed zone is maintained at 140°±20° C., the temperature of the melting, metering, and mixing zones is maintained at 180°±20° C., and the temperature in the cooling and temperature control zone is maintained at 120°±20° C. The temperature of the polymer gel as it expands through the die orifice is preferably just above the temperature at which solid polymer would crystallize out of the gel and will vary depending upon the particular polymer blend utilized.

As is conventional, finely divided solid materials such as talc, calcium silicate, zinc stearate, and the like can advantageously be incorporated with the polymer gel prior to expansion. Such finely divided materials aid in controlling the size of the cells and may be employed in amounts up to five percent by weight of the polymer. Numerous fillers, pigments, lubricants, and the like well known in the art can also be incorporated as desired.

The specific working examples that follow are intended to illustrate the invention, but are not to be taken as limiting the scope thereof. In the examples, parts and percentages are by weight unless otherwise specified or requried by the context.

EXAMPLE I

The apparatus used in this example is a 1¼" screw type extruder having two additional zones for mixing and cooling at the end of usual sequential zones for feeding, melting and metering. An opening for blowing agent injection is provided on the extruder barrel between the metering and mixing zones. A small syringe-type pump is connected to the blowing agent stream for additive injections. At the end of cooling zone, there is attached a die orifice having an opening of rectangular shape. The height of the opening, called die gap hereinafter, is adjustable while its width is fixed at 6.25 mm (0.25″).

An 80/20 by weight blend of a low density polyethylene (2.3 melt index; 0.923 gm/cc density) and a polystyrene of 200,000 weight average molecular weight was used. The two granular polymers were blended in a tumbler. A small amount (0.05 pph) of talc was adhered to the polymer granules by use of a wetting agent. Dichlorodifluoromethane (FC-12) was used as the blowcollapse resulted. The foam improved dramatically when a small amount (0.0051 pph) of organic peroxide crosslinking agent was introduced. At a higher level of peroxide (0.081 pph), the foam quality was even better.

The foams produced had low densities, large cross-section, large cell size, a reasonably low percentage of open cells, and had a good appearance and good flow stability. Advantageously, the line pressures did not rise appreciably. The foams showed excellent dimensional stability (shrinkage less than 11%) during ambient aging. This compares quite favorably with low density polyethylene foams made with the same blowing agent which typically shrink over 30% of their initial volume during ambient aging.

TABLE I

| TEST NO. | FC-12 LEVEL (pph) (1) | DI-CUMYL PEROXIDE LEVEL (pph) (2) | GEL TEMP. (°C.) (3) | DIE GAP (mm) (4) | DIE PRESS. (5) | EXTRUD. PRESS. (6) | FOAM THICK (mm) (7) | FOAM WIDTH (mm) (8) | FOAM DENSITY (9) | CELL SIZE (mm) (10) | OPEN CELL (%) (11) | FOAM APPEAR. (12) | FOAM STAB. (13) |
|---|---|---|---|---|---|---|---|---|---|---|---|---|---|
| 1 | 19.6 | — | 111 | 1.78 | 36.9 | 77.3 | 6.1 | 14.5 | 253.0 | ND | ND | C | — |
|   |      |    |     | 1.52 | 44.3 | 78.7 | 5.6 | 14.0 | 288.0 | ND | ND | C | — |
|   |      |    |     | 1.27 | 54.8 | 100.6 | 4.3 | 11.4 | 363.0 | ND | ND | C | — |
| 2 | 19.6 | 0.051 | 111 | 2.29 | 37.3 | 73.8 | 22.9 | 33.8 | 28.5 | 1.25 | 53.0 | V,H | E |
|   |      |       |     | 2.03 | 40.1 | 77.3 | 20.6 | 33.5 | 34.3 | 1.16 | 61.8 | V,H | E |
|   |      |       |     | 1.78 | 42.2 | 84.4 | 18.3 | 33.0 | 37.2 | 1.25 | 72.0 | V,H | W |
| 3 | 19.6 | 0.081 | 111 | 2.54 | 33.7 | 66.8 | 27.4 | 37.8 | 27.5 | 1.81 | 33.5 | V,H | W |
|   |      |       |     | 2.29 | 34.8 | 75.9 | 25.4 | 37.1 | 26.4 | 1.25 | 29.3 | V,H | G |
|   |      |       |     | 2.03 | 35.2 | 70.3 | 25.4 | 36.3 | 26.4 | 1.62 | 34.7 | G | E |
|   |      |       |     | 1.78 | 36.6 | 77.3 | 22.1 | 36.8 | 25.3 | 1.16 | 33.6 | G | W |
|   |      |       |     | 1.52 | 38.0 | 82.3 | 18.0 | 34.5 | 27.9 | 1.01 | 41.3 | G | W |

Notes:
All formulations contained 0.05 pph talc
ND not determined
(1) difluorodichloromethane mixed in per hundred parts of polymer
(2) parts of dicumyl peroxide mixed in per hundred parts of polymer
(3) temperature in degrees centigrade to which the gel was cooled down prior to foam expansion
(4) gap of die opening in millimeters at which samples were taken
(5),(6) pressure in kilograms per square centimeter at the die and at the extruder discharge, respectively
(7),(8) thickness and width of foam body in millimeters measured within about five minutes after extrusion
(9) density of foam body in kilograms per cubic meter measured in about one month
(10) cell size in millimeter in horizontal direction determined per ASTM D-3576
(11) open cell content in percent determined per ASTM D-2856-A
(12) subjective judgement of foam appearance; C = total collapse, V = voids of smaller dimensions contained in the foam, H = hairy skin originating from prefoaming, G = good, E = excellent
(13) the behavior of extrudate, W = wobbly strand, G = good, E = excellent ing agent. Dicumyl peroxide was used as the crosslinking agent and was injected with the blowing agent in the amounts indicated in Table I. Extruder temperatures were set at 140° C. at feeding zone, 180° C. at melting and metering zone, an 200° C. at mixing zone, respectively. The gel temperature was maintained at 111° C. The test results are summarized below in Table I.

As can be seen, the blend, which was outside the operable ranges set forth in Japanese Patent Application No. 55/181,384, was indeed inoperable. Total foam

EXAMPLE II

The apparatus and operating conditions of Example I were again utilized. The polymer used in this example was an 80/20 by weight blend of a linear low density polyethylene (melt index 1.0; 0.935 gm/cc density) and a polystyrene of 200,000 weight average molecular weight. The addition of 0.02 pph peroxide crosslinking agent improved the flow stability and appearance of the foam. The results are reported in Table II below.

TABLE II

| TEST NO. | FC-12 LEVEL (pph) (1) | DI-CUMYL PEROXIDE LEVEL (pph) (2) | GEL TEMP. (°C.) (3) | DIE GAP (mm) (4) | DIE PRESS. (5) | EXTRUD. PRESS. (6) | FOAM THICK (mm) (7) | FOAM WIDTH (mm) (8) | FOAM DENSITY (9) | CELL SIZE (mm) (10) | OPEN CELL (%) (11) | FOAM APPEAR. (12) | FOAM STAB. (13) |
|---|---|---|---|---|---|---|---|---|---|---|---|---|---|
| 1 | 19.6 | 0 | 124 | 2.03 | 29.5 | 88.6 | 12.7 | 27.2 | 35.5 | 0.38 | 97.1 | B,O | W |
|   |      |   |     | 1.78 | 30.2 | 91.4 | 10.7 | 26.9 | 33.6 | 0.39 | 95.1 | O | W |
|   |      |   |     | 1.52 | 31.6 | 94.9 | 10.2 | 27.2 | 37.2 | 0.34 | 95.4 | O | G |
| 2 | 19.6 | 0.02 | 124 | 2.03 | 30.6 | 98.4 | 14.5 | 27.7 | 30.9 | 0.10 | 86.8 | B,O | G |
|   |      |      |     | 1.78 | 33.7 | 101.9 | 11.7 | 28.7 | 33.3 | 0.23 | 96.2 | O | G |
|   |      |      |     | 1.52 | 36.9 | 105.4 | 11.7 | 28.4 | 34.1 | 0.11 | 94.3 | O | E |

TABLE II-continued

| TEST NO. | FC-12 LEVEL (pph) (1) | DI-CUMYL PER-OXIDE LEVEL (pph) (2) | GEL TEMP. (°C.) (3) | DIE GAP (mm) (4) | DIE PRESS. (5) | EXTRUD. PRESS. (6) | FOAM THICK (mm) (7) | FOAM WIDTH (mm) (8) | FOAM DEN-SITY (9) | CELL SIZE (mm) (10) | OPEN CELL (%) (11) | FOAM APPEAR. (12) | FOAM STAB. (13) |
|---|---|---|---|---|---|---|---|---|---|---|---|---|---|
| | | | | 1.27 | 42.5 | 107.2 | 11.4 | 27.9 | 34.6 | 0.10 | 96.1 | O | E |

Notes:
all formulations contained 0.05 pph talc
(1) difluorodichloromethane mixed in per hundred parts of polymer
(2) parts of dicumyl peroxide mixed in per hundred parts of polymer
(3) temperature in degrees centigrade to which the gel was cooled down prior to foam expansion
(4) gap of die opening in millimeters at which samples were taken
(5),(6) pressure in kilograms per square centimeter at the die and at the extruder discharge, respectively
(7),(8) thickness and width of foam body in millimeters measured within about five minutes after extrusion
(9) density of foam body in kilograms per cubic meter measured in about one month
(10) cell size in millimeter in horizontal direction determined per ASTM D-3576
(11) open cell content in percent determined per ASTM D-2856-A
(12) subjective judgement of foam appearance; O = open cells, B = blips or large voids contained in the foam, G = good, E = excellent
(13) the behavior of extrudate, W = wobbly strand, G = good, E = excellent While the methods and compositions herein described constitute preferred embodiments of the invention, it is to be understood that the invention is not limited to these precise methods and compositions, and that changes may be made in either without departing from the scope of the invention, which is defined in the appended claims.

What is claimed is:

1. A process for preparing a lightly crosslinked polymer foam material comprising the steps of:
    (a) melt processing under pressure from about 95 to 50% by weight of a low density ethylene polymer and from about 5 to 50% by weight of a styrene polymer together with a volatile blowing agent and a sufficient amount of a free radical generating compound as a crosslinking agent, to form a flowable admixture; and
    (b) extruding said admixture through a die to a zone of lower pressure and activating said blowing agent to expand said admixture of polymers to a cellular structure crosslinked with itself to form a lightly crosslinked polymer foam material.

2. The process of claim 1 in which said free radical generating compound is an organic peroxide.

3. The process of claim 1 in which said ethylenic polymer is a low density polyethylene.

4. The process of claim 1 in which said styrenic polymer is polystyrene.

* * * * *